United States Patent
Yi et al.

(10) Patent No.: US 8,774,112 B2
(45) Date of Patent: Jul. 8, 2014

(54) METHOD IN WHICH USER EQUIPMENT PERFORMS RANDOM ACCESS IN A CARRIER AGGREGATION MOBILE COMMUNICATION SYSTEM

(75) Inventors: Seung June Yi, Anyang-si (KR); Sung Duck Chun, Anyang-si (KR); Sung Hoon Jung, Anyang-si (KR); Young Dae Lee, Anyang-si (KR); Sung Jun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 83 days.

(21) Appl. No.: 13/376,373

(22) PCT Filed: Jun. 7, 2010

(86) PCT No.: PCT/KR2010/003626
§ 371 (c)(1),
(2), (4) Date: Dec. 5, 2011

(87) PCT Pub. No.: WO2010/143846
PCT Pub. Date: Dec. 16, 2010

(65) Prior Publication Data
US 2012/0076126 A1 Mar. 29, 2012

Related U.S. Application Data

(60) Provisional application No. 61/184,833, filed on Jun. 7, 2009.

(51) Int. Cl.
*H04W 72/04* (2009.01)

(52) U.S. Cl.
USPC .......................................... 370/329; 370/448

(58) Field of Classification Search
USPC ................................................. 370/328, 329
See application file for complete search history.

(56) References Cited

U.S. PATENT DOCUMENTS

| 6,177,861 | B1 | 1/2001 | MacLellan et al. |
| 2010/0124188 | A1* | 5/2010 | Wu ............................... 370/328 |
| 2010/0227569 | A1* | 9/2010 | Bala et al. ....................... 455/73 |
| 2010/0296467 | A1* | 11/2010 | Pelletier et al. ............... 370/329 |
| 2012/0008575 | A1* | 1/2012 | Vujcic ............................ 370/329 |
| 2012/0020322 | A1* | 1/2012 | Fan et al. ...................... 370/330 |

FOREIGN PATENT DOCUMENTS

| JP | 2003-509923 | 3/2003 |
| KR | 1020070121589 | 12/2007 |
| KR | 1020080094528 | 10/2008 |

OTHER PUBLICATIONS

NTT DoCoMo, "Initial Access Procedure for Asymmetric Wider Bandwidth in LTE-Advanced," 3GPP TSG RAN WG1 Meeting #54bis, R1-083680, Sep. 2008, 5 pages.

(Continued)

*Primary Examiner* — Anh-Vu Ly
*Assistant Examiner* — Hashim Bhatti
(74) *Attorney, Agent, or Firm* — Lee, Hong, Degerman, Kang & Waimey

(57) ABSTRACT

The present document relates to a method in which user equipment carries out a process for random access to a base station in a carrier aggregation mobile communication system which performs communications using a plurality of component carriers (CCs), and to a terminal device for the method. The user equipment separately manages back-off operations for each of the CCs, and performs a random access preamble transmission using the relevant CC if another usable CC exists, even when a back-off period is being applied to a specific CC, to carry out a random access process in an efficient manner in a carrier aggregation mobile communication system.

10 Claims, 9 Drawing Sheets

(56) References Cited

OTHER PUBLICATIONS

3rd Generation Partnership Project (3GPP), "Technical Specification Group Radio Access Network; Evolved Universal Terrestrial Radio Access (E-UTRA) Medium Access Control (MAC) protocol specification (Release 8)," 3GPP TS 36.321 V8.5.0, Mar. 2009, pp. 1, 12-16, 39.

Ericsson, "Carrier aggregation in LTE-Advanced," TSG-RAN WG1 #53bis, R1-082468, Jun. 2008, 6 pages.

\* cited by examiner

METHOD IN WHICH USER EQUIPMENT PERFORMS RANDOM ACCESS IN A CARRIER AGGREGATION MOBILE COMMUNICATION SYSTEM

CROSS-REFERENCE TO RELATED APPLICATIONS

This application is a 371 U.S. national stage application of International Application No. PCT/KR2010/003626, filed on Jun. 7, 2010, which claims priority to U.S. Provisional Application Ser. No. 61/184,833, filed on Jun. 7, 2009, the contents of which are incorporated by reference herein in their entirety.

TECHNICAL FIELD

The following description relates to a method for random access to a base station by a user equipment (UE) in a mobile communication system using carrier aggregation in which communication is conducted over a plurality of component carriers, and a terminal for executing the method.

BACKGROUND ART

Long Term Evolution (LTE) is a mobile communication system evolved from Universal Mobile Telecommunications System (UMTS), standardized by an international standardization organization, the $3^{rd}$ Generation Partnership Project (3GPP). The configuration of an LTE system is illustrated in FIG. 1.

FIG. 1 is a view referred to for describing the configuration of an LTE system.

The LTE system may be divided largely into an Evolved UMTS Terrestrial Radio Access Network (E-UTRA) and an Evolved Packet Core (EPC). The E-UTRAN includes UEs and evolved Node Bs (eNBs). A UE is connected to an eNB via a Uu interface and one eNB is connected to another eNB via an X2 interface. The EPC includes a Mobility Management Entity (MME) responsible for control-plane functions and a Serving GateWay (S-GW) responsible for user-plane functions. An eNB is connected to the MME via an S1-MME interface and an eNB is connected to the S-GW via an S1-U interface. These two interfaces are collectively called an S1 interface.

For the Uu interface being an air interface, a radio interface protocol is defined. The radio interface protocol horizontally includes a physical layer, a data link layer, and a network layer and vertically includes a user-plane (U-plane) for user data transmission and a control-plane (C-plane) for control signaling. Based on the lowest three layers of the Open System Interconnection (OSI) reference model, this radio interface protocol can be divided into Layer 1 (L1) including a physical layer PHY, Layer 2 (L2) including a Medium Access Control/Radio Link Control/Packet Data Convergence Protocol (MAC/RLC/PDCP) layer, and Layer 3 (L3) including a Radio Resource Control (RRC) layer. These layers are defined in pairs between a UE and an E-UTRAN, for data transmission via the Uu interface.

Now a description will be given below of a Long-Term Evolution Advanced (LTE-A) system.

LTE-A is a system developed from LTE to meet $4^{th}$ Generation mobile communication requirements, that is, IMT-Advanced requirements recommended by the International Telecommunication Union-Radio communication sector (ITU-R). The 3GPP which developed the LTE system standard is now actively working on standardization of the LTE-A system.

Major technologies added to the LTE-A system are carrier aggregation for extending a used bandwidth and flexibly using the bandwidth and use of relays for improving coverage, supporting group mobility and enabling user-centered network deployment.

FIGS. 2 and 3 are views referred to for describing radio protocol layers.

At L1, the PHY layer provides information transfer service to a higher layer on physical channels. The PHY layer is connected to the MAC layer through transport channels and data is transferred between the MAC layer and the PHY layer on the transport channels. The transport channels are largely divided into dedicated transport channels and common transport channels depending on whether the transport channels are shared or not. Data is transmitted on physical channels using radio resources between different PHY layers, that is, the PHY layers of a transmitter and a receiver.

There is a plurality of layers at L2. The MAC layer maps logical channels to transport channels and performs logical channel multiplexing by mapping a plurality of logical channels to one transport channel. The MAC layer is connected to a higher layer, namely the RLC layer, through logical channels. Depending on the types of information carried on the logical channels, the logical channels are classified into control channels that deliver C-plane information and traffic channels that deliver U-plane information.

The RLC layer at L2 adjusts a data size to be suitable for data transmission in the air interface from a lower layer by segmenting and concatenating data received from a higher layer. In order to guarantee various Quality of Service (QoS) requirements of each Radio Bearer (RB), the RLC layer provides three operation modes, Transparent Mode (TM), Unacknowledged Mode (UM), and Acknowledged Mode (AM). Especially, an AM RLC performs a retransmission function through Automatic Repeat and Request (ARQ), for reliable data transmission.

The PDCP layer at L2 compresses a header to reduce the size of an Internet Protocol (IP) packet header of a relatively large size containing unnecessary control information to efficiently transmit an IP packet such as an IPv4 or IPv6 packet via a radio link having a narrow bandwidth. The header compression function enables transmission of necessary information in a header only, thereby increasing the transmission efficiency of a radio link. In addition, the PDCH layer performs a security function in the LTE system. This security function involves ciphering for preventing a third party from eavesdropping and integrity protection for preventing a third party from maliciously modifying data.

The RRC layer at the highest of L3 is defined only in the C-plane. The RRC layer takes charge of controlling logical channels, transport channels, and physical channels in relation to configuration, reconfiguration, and release of Radio Bearers (RBs). An RB is a logical path provided by L1 and L2 in the radio protocol architecture, for data transmission between a UE and a UTRAN. In general, configuring an RB means defining the features of a radio protocol layer and channels needed to provide a specific service and setting specific parameters and an operation scheme. RBs are classified into a Signaling RB (SRB) and Data RB (DRB). The SRB is used as a path in which an RRC message is transmitted on the C-plane and the DRB is used as a path via which user data is transmitted on the U-plane.

Now a description will be given of Carrier Aggregation (CA) in the LTE-A system.

FIG. 4 is a view referred to for describing CA.

As described above, the LTE-A standard is designed as an IMT-Advanced candidate technology of the ITU to satisfy IMT-Advanced technical requirements. Accordingly, extension of a bandwidth from the legacy LTE system is under discussion to satisfy IMT-Advanced technical requirements. For bandwidth extension, carriers available to the legacy LTE system are defined as Component Carriers (CCs) in the LTE-A system. Aggregation of up to 5 CCs is under discussion, as illustrated in FIG. 4. Because a CC may occupy up to 20 MHz as in the LTE system, the CA technology of the LTE-A standard is a concept of extending a bandwidth to up to 100 MHz. Technology for aggregating a plurality of CCs is called CA.

DISCLOSURE

Technical Problem

As described above, a UE to which the CA is applied can transmit/receive data to/from an eNB through a plurality of uplink CCs (hereinafter referred to as 'UL CCs') and a plurality of downlink CCs (hereinafter referred to as 'DL CCs'). In addition, a PRACH resource capable of transmitting a random access preamble can be established for each UL CC.

Meanwhile, LTE-A 3GPP Release 10 has considered a scheme of performing a random access procedure only through one CC at a specific time for simplification of implementation of the random access procedure. In the case where the UE conforms to the legacy 3GPP LTE system, if the UE receives a random access response including a backoff indicator after transmitting a random access preamble, the UE may transmit a random access preamble after the lapse of a backoff period.

A description will be given of a method for performing random access at a UE, which is able to accomplish the above-mentioned simplification of implementation of a random access procedure while making sufficient use of the features of the aforementioned CA system, and a UE configuration for the method.

Technical Solution

The object of the present invention can be achieved by providing a method for performing a random access procedure to an eNB at a UE in a mobile communication system using carrier aggregation in which communication is performed using a plurality of component carriers, the method includes: transmitting a first random access preamble to the eNB through a first uplink component carrier (hereinafter referred to as 'UL CC') from among a plurality of UL CCs; receiving a first random access response message including a backoff indicator as a response to the first random access preamble through a first downlink component carrier (hereinafter referred to as 'DL CC') corresponding to the first UL CC; applying a backoff period to the first UL CC in consideration of the backoff indicator received through the first random access response message; and transmitting a second random access preamble to the eNB through a second UL CC to which a backoff period is not applied from among the plurality of UL CCs even during the backoff period of the first UL CC.

The UE may independently administrate backoff operations for the plurality of UL CCs when performing the random access procedure to the eNB. The method may further include acquiring information about the plurality of UL CCs applicable for the random access procedure to the eNB and information about a plurality of DL CCs respectively corresponding to the plurality of UL CCs.

The method may further include: receiving a second random access response message including a backoff indicator as a response to the second random access preamble through a second DL CC corresponding to the second UL CC; applying a backoff period to the second UL CC in consideration of the backoff indicator received through the second random access response message; and transmitting a third random access preamble to the eNB through a UL CC corresponding to a backoff period which is ended first from among the plurality of UL CCs when backoff periods are applied to all the plurality of UL CCs.

The UE may be configured to transmit a random access preamble only through one of the plurality of UL CCs at a specific time and receive a random access response message only through a DL CC corresponding to the one UL CC at a specific time.

In another aspect of the present invention, provided herein is a user equipment (UE) performing a random access procedure to an eNB in a mobile communication system using carrier aggregation in which communication is performed using a plurality of component carriers, the UE including: a MAC layer module including a plurality of HARQ entities respectively corresponding to the plurality of component carriers, and controlling signal transmission using a plurality of uplink component carriers (referred to as 'UL CCs') and signal reception using a plurality of downlink component carriers (referred to as 'DL CCs') respectively corresponding to the plurality of UL CCs through the plurality of entities; and a processor functionally connected with the MAC layer module and including a physical layer module performing signal transmission through the plurality of UL CCs and signal reception through the plurality of DL CCs, wherein when a second UL CC to which a backoff period is not applied from among the plurality of UL CCs is present even during a backoff period for a first UL CC, the processor is configured to transmit a random access preamble to the eNB through the second UL CC.

The processor may independently manage backoff operations for the plurality of UL CCs when performing the random access procedure to the eNB. The processor may store information about the plurality of UL CCs applicable to the random access procedure to the eNB and information about the plurality of DL CCs respectively corresponding to the plurality of UL CCs.

The processor may be configured to transmit a random access preamble to the eNB through a UL CC corresponding to a backoff period which is ended first from among the plurality of UL CCs when backoff periods are applied to all the plurality of UL CCs. The processor may be configured to transmit a random access preamble only through one of the plurality of UL CCs at a specific time and receive a random access response message only through a DL CC corresponding to the one UL CC at a specific time.

Advantages of Invention

In accordance with embodiments of the present invention as described above, it is possible to reduce a time required for a random access procedure while minimizing an increase in complexity of the random access procedure due to use of a plurality of CCs.

BEST MODE FOR CARRYING OUT THE INVENTION

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details. For example, the following detailed description is given under the assumption that a system conforming to one of the 3GPP LTE series of standards is being used. However, the description is applicable to any other mobile communication system except for specific features inherent to the 3GPP LTE series of standards.

In some instances, known structures and devices are omitted or are shown in block diagram form, focusing on important features of the structures and devices, so as not to obscure the concept of the invention. The same reference numbers will be used throughout this specification to refer to the same or like parts.

In the following description, the term terminal generically refers to a mobile or fixed user terminal device such as a User Equipment (UE), a Mobile Station (MS), etc. In addition, the term Base Station (BS) generically refers to any node at a network end which communicates with a UE, such as a Node B, an eNode B, etc.

Hereinbelow, a random access procedure performed in the LTE system and a case in which the random access procedure is performed in a system to which CA is applied will be described in greater detail.

In the LTE system, a UE may perform the random access procedure,
- when the UE initially accesses an eNB without an RRC connection having been established therebetween,
- when the UE initially accesses a target cell during handover,
- when the random access procedure is requested by a command from the eNB,
- upon generation of uplink data in a situation in which uplink time synchronization has not been acquired or specified radio resources for use in requesting radio resources have not been allocated, or
- when radio link failure or handover failure is recovered.

Based on the above description, a general contention-based random access procedure will be described below.

Figure 5:
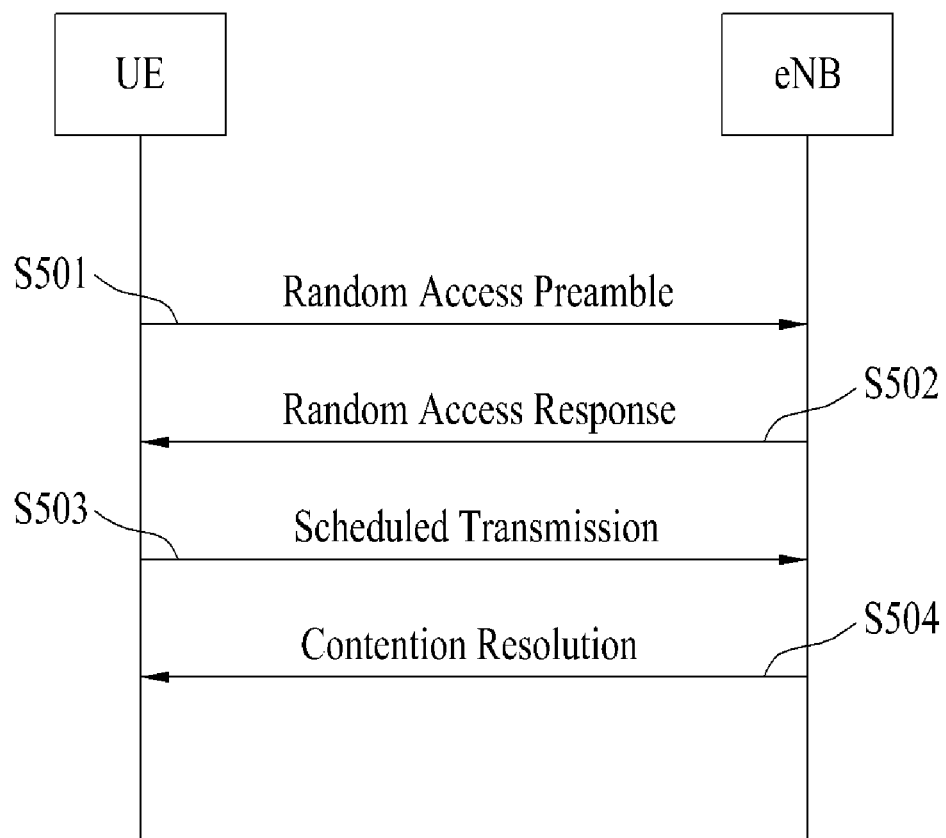
FIG. 5 is a diagram illustrating a signal flow for operations of a User Equipment (UE) and an evolved Node B (eNB) in a contention-based random access procedure.

FIG. 5 is a diagram illustrating a signal flow for operations of a UE and an eNB in a contention-based random access procedure.

(1) Transmission of First Message

The UE may select a random access preamble randomly from a random preamble set indicated by system information or a handover command, select Physical Random Access CHannel (PRACH) resources, and transmit the random access preamble through selected Physical PRACH (PRACH) resources (S501).

(2) Reception of Second Message

After transmitting the random access preamble in step S501, the UE attempts to receive a random access response within a random access response reception window indicated through the system information or the handover command by the eNB (S502). To be more specific, the random access response may be transmitted in the form of a Medium Access Control Protocol Data Unit (MAC PDU) and the MAC PDU may be delivered over a Physical Downlink Shared CHannel (PDSCH). To receive information on the PDSCH successfully, the UE preferably monitors a Physical Downlink Control CHannel (PDCCH). That is, the PDCCH preferably carries information about a UE to receive the PDSCH, information about the frequency and time of radio resources of the PDSCH, and information about the transmission format of the PDSCH. Once the UE succeeds in receiving the PDCCH destined therefor, the UE may successfully receive a random access response over the PDSCH according to information carried over the PDCCH. The random access response may include an identifier (ID) of the random access preamble (e.g. a Random Access Preamble ID (RAPID)), an Uplink (UL) Grant indicating uplink radio resources, a temporary Cell-Radio Network Temporary Identify (C-RNTI), and a Timing Advance Command (TAC).

The reason for including the RAPID in the random access response is that because one random access response may contain random access response information for one or more UEs, it is necessary to indicate a UE to which the UL Grant, the temporary C-RNTI, and the TAO are valid. It is assumed in step S502 that the ID of the random access preamble is identical to the RAPID included in the random access response. Thus, the UE may receive the UL Grant, the temporary C-RNTI, and the TAO.

(3) Transmission of Third Message

Upon receipt of a valid random access response, the UE processes information included in the random access response. That is, the UE applies the TAO and stores the temporary C-RNTI. In addition, the UE may store data to be transmitted in a message3 buffer in correspondence with the reception of a valid random access response.

Meanwhile, the UE transmits data (i.e. a third message) to the eNB using the received UL Grant (S503). The third message should include an ID of the UE. In the contention-based random access procedure, the eNB cannot identify UEs that perform the random access procedure. However, the eNB should identify the UEs to avoid later collision therebetween.

Two methods have been discussed to include the ID of the UE in the third message. One of the methods is that if the UE has a valid C-RNTI allocated by the cell before the random access procedure, the UE transmits its C-RNTI in an uplink signal corresponding to the UL Grant. On the other hand, if a valid C-RNTI has not been allocated to the UE before the random access procedure, the UE transmits its UE ID (e.g. S-TMSI or a random ID) in data. In general, the UE ID is longer than the C-RNTI. If the UE transmits data corresponding to the UL Grant, the UE activates a Contention Resolution (CR) timer to avoid contention.

(4) Reception of Fourth Message

After transmitting its ID in data according to the UL Grant included in the random access response, the UE awaits reception of a command for contention resolution from the eNB. That is, the UE attempts to receive a PDCCH in order to receive a specific message (S504). For PDCCH reception, two methods may be considered. When the third message is transmitted using the C-RNTI according to the UL Grant as described above, the UE attempts to receive a PDCCH using the C-RNTI. If the ID included in the third message is the UE ID, the UE may attempt to receive a PDCCH using the temporary C-RNTI included in the random access preamble. In the former case, if the UE receives a PDCCH using the C-RNTI before expiration of the CR timer, the UE ends the random access procedure, determining that the random access procedure has been performed normally. In the latter case, if the UE receives a PDCCH using the temporary C-RNTI before expiration of the CR timer, the UE checks data received on a PDSCH indicated by the PDCCH. If the data includes its UE ID, the UE ends the random access procedure, determining that the random access procedure has been performed normally.

Meanwhile, a contention free random access procedure is ended only by transmitting first and second messages, which is different from the contention-based random access procedure shown in FIG. 5. However, the UE is allocated a random access preamble by the eNB before it transmits a random access preamble as the first message to the eNB. The UE transmits the allocated random access preamble as the first message to the eNB, and ends the random access procedure by receiving a random access response from the eNB.

A description will be given of a method for performing a random access procedure as described above for an eNB at a UE in a communication system to which CA is applied according to an embodiment of the present invention.

As described above, a UE to which CA is applied can transmit/receive data to/from an eNB through a plurality of UL CCs and a plurality of DL CCs. In addition, a PRACH resource capable of transmitting a random access preamble can be established for each UL CC. In this situation, the following scenario may be considered.

1. The UE may select any of UL CCs allocated thereto and transmit a random access preamble to the eNB in order to perform a random access procedure.

2. Due to random access load of the UL CCs, the eNB may instruct the UE to perform a backoff operation such that the UE retransmits a random access preamble after the lapse of a random time.

3. While UL CCs which are allocated PRACH resources and currently have a normal random access load state may be included in the UL CCs assigned to the UE, the UE should transmit a random access preamble to the eNB after the lapse of a random time corresponding to a backoff period according to the conventional technology.

Even though the UE can use a plurality of UL CCs according to the CA function, as described above, when the UE receives a backoff indicator for a specific UL CC from the eNB, re-transmission of a random access preamble is unnecessarily delayed for a random time if the UE cannot use other UL CCs.

Accordingly, when a plurality of UL CCs, which can be used even during a backoff period (random period) for a specific UL CC, include a UL CC to which the backoff period is not applied, the UE according to an embodiment of the present invention transmits a random access preamble through the corresponding UL CC.

Figure 6:
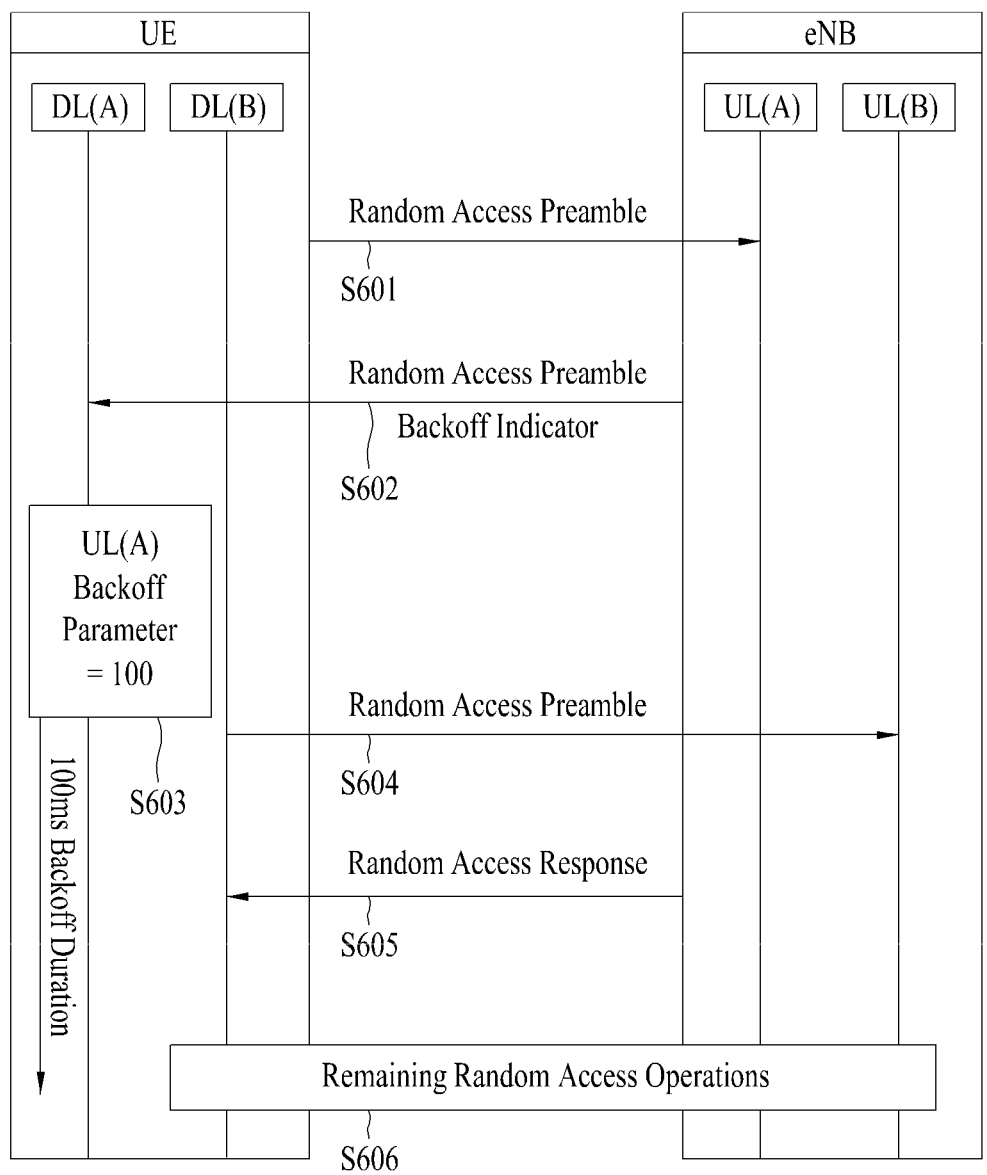
FIG. 6 is a view referred to for describing a method for performing random access to the eNB at the UE according to an embodiment of the present invention.

FIG. 6 is a view referred to for describing a method for performing random access to the eNB at the UE according to an embodiment of the present invention.

In FIG. 6, it is assumed that the UE and the eNB perform communication using two DL CCs (DL(A) and DL(B)) and two UL CCs (UL(A) and UL(B)), respectively. That is, it is assumed that UL(A) is connected with DL(A) and UL(B) is connected with DL(B). The UE can acquire information about available CCs and information about connection between a UL CC and a DL CC through system information received from the eNB.

Referring to FIG. 6, the UE may transmit a random access preamble to the eNB through UL(A) (S601). While the embodiment of the present invention is described on the assumption that the random access procedure performed by the UE is a contention-based random access procedure, the present invention can be applied to contention free random access.

The eNB may transmit a random access response message to the UE in response to the random access preamble transmitted to the eNB in step S601 (S602). The random access response message is received through DL(A) corresponding to UL(A) transmitting the random access preamble. The random access response message may include a backoff indicator due to the load of UL(A).

Upon receipt of the random access response message including the backoff indicator, the UE may calculate a backoff period for random access preamble re-transmission (S603). The embodiment of the present invention is described on the assumption that the UE calculates the backoff period as 100 ms. Particularly, the backoff period calculated by the UE is for UL(A) rather than all UL CCs in the embodiment of the present invention. That is, the UE (UE processor) according to the embodiment of the present invention may independently manage a backoff period for each UL CC.

The UE in accordance with the embodiment of the present invention may check whether other UL CCs can be used even before the lapse of the backoff period of 100 ms. That is, the UE may transmit a random access preamble using another UL CC to which a valid PRACH resource is assigned and backoff is not set even during a backoff period for a specific UL CC. In the embodiment shown in FIG. 6, the UE transmits a random access preamble to the eNB through UL(B) which can be used during the backoff period for UL(A) (S604). Upon receipt of the random access preamble through UL(B), the eNB may transmit a random access response message to the UE through DL(B) (S605). Upon receipt of the random access response message, the UE may perform remaining operations such as an operation of receiving third and fourth messages (S606). However, step S606 may be omitted when this procedure corresponds to contention free random access.

In the embodiment of the present invention illustrated in FIG. 6, even when a backoff period is set for a specific UL CC, a random access procedure may be performed using a UL CC other than the specific UL CC because the UE administrates backoff for each UL CC independently. Specifically, the UE according to the embodiment of the present invention may discriminate a UL CC to which backoff is applied through a DL CC which is used to receive a random access response including a backoff indicator from the eNB.

In accordance with another embodiment of the present invention, when backoff is set for all UL CCs that can be used by the UE, a random access preamble is retransmitted using a UL CC corresponding to a backoff period which is ended first.

Figure 7:
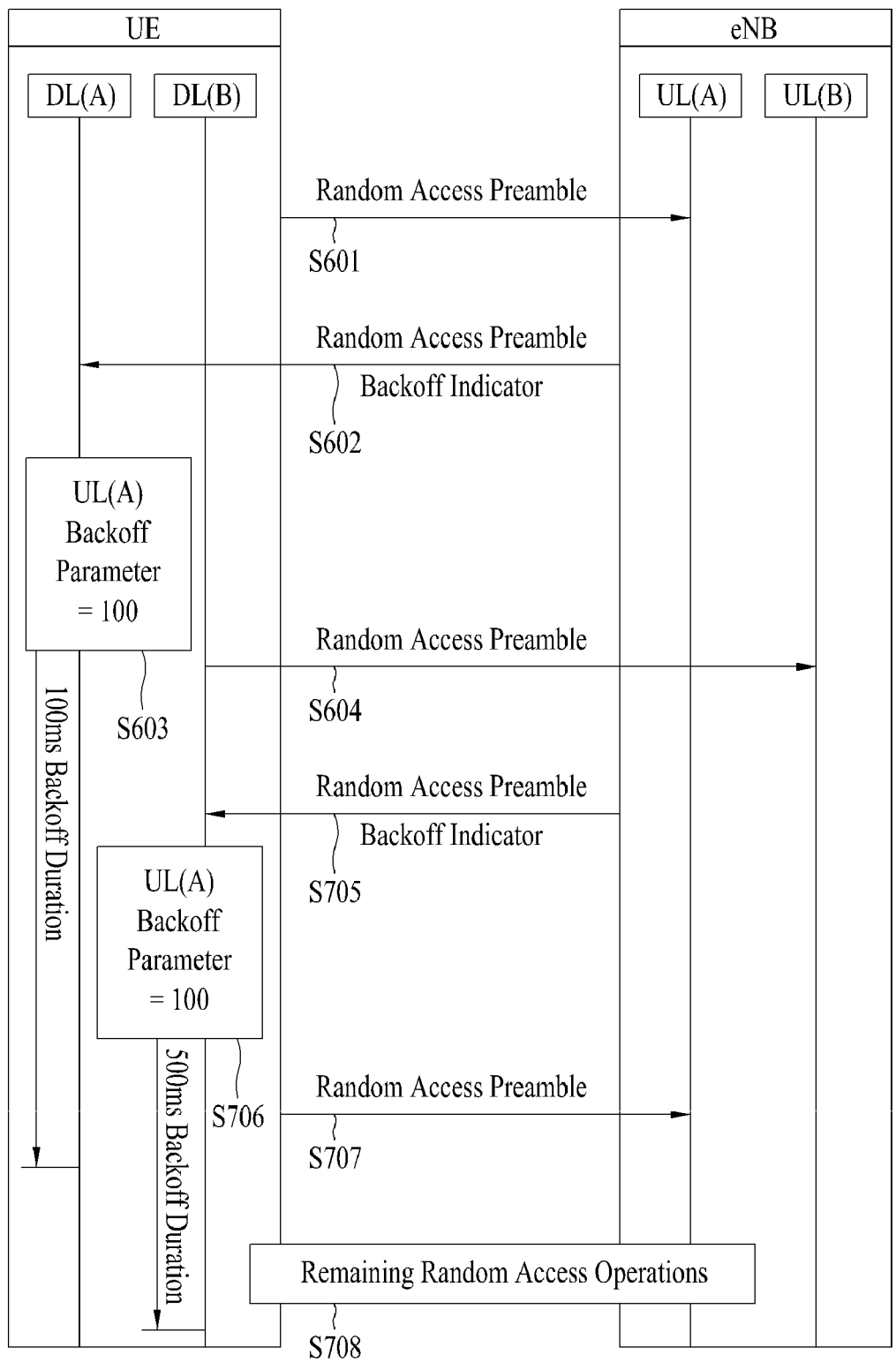
FIG. 7 is a view referred to for describing a method for retransmitting a random access preamble at the UE according to an embodiment of the present invention.

FIG. 7 is a view referred to for describing a method for retransmitting a random access preamble at the UE according to an embodiment of the present invention.

In FIG. 7, steps S601 to S604 correspond to those illustrated in FIG. 6. That is, the UE transmits a random access preamble through UL(A) and receives a random access response message including a backoff indicator from the eNB through DL(A). Even when a backoff period of 100 ms is applied to UL(A), the UE can transmit a random access preamble through UL(B).

It is assumed that the eNB transmits a random access response message including a backoff indicator through DL(B) in response to the random access preamble transmitted from the UE through UL(B) (S705). Upon receipt of the random access response message including the backoff indicator from the eNB, the UE may calculate a backoff period for UL(B) (S706). It is assumed that the UE calculates a backoff period of 50 ms for UL(B) in the embodiment of the present invention.

If backoff periods are applied to both UL(A) and UL(B), the UE cannot retransmit a random access preamble until the backoff periods end. However, the UE according to the embodiment of the present invention may select a UL CC corresponding to a backoff period which is ended first among all the UL CCs without being limited to a specific UL CC, and use the selected UL CC for random access preamble retransmission. In the embodiment of the present invention, illustrated in FIG. 7, the UE attempts to retransmit a random access preamble through UL(A) after the backoff period for UL(A) is ended (S707) since the backoff period for UL(A) is finished prior to the backoff period for UL(B). Then, the UE may perform the remaining random access procedure such as reception of a second message, transmission of a third message, and reception of a fourth message (S708).

In the case where backoff periods for two or more UL CCs are simultaneously ended while backoff is applied to all UL CCs available to the UE, the UE may select a random UL CC from among the UL CCs corresponding to the backoff periods simultaneously ended and use the selected UL CC for random access preamble retransmission.

As described above, in the 3GPP LTE-A release 10, a random access procedure is performed through only one CC at a specific time for simplification of implementation. However, when one random access procedure includes not only transmission of a first message and reception of a second message but also retransmission of the first message, reception of the second message, transmission of a third message and reception of a fourth message after application of backoff in a contention-based random access procedure, it is impossible to administrate backoff for each CC and use other CCs during a backoff period for a specific CC as described above.

Accordingly, a random access procedure is performed through one CC at a specific time on the assumption that the random access procedure includes transmission of the first message and reception of the second message in an embodiment of the present invention. Since transmission of the third message and reception of the fourth message are classified as normal HARQ operations, it is assumed that they are not included in the concept of "one random access procedure".

In accordance with another embodiment of the present invention, while the overall procedure with respect to the first, second, third and fourth messages is considered as a random access procedure, when a random access response message including a backoff indicator is received in the second message and thus the random access procedure needs to wait for a specific backoff period to end, the random access procedure is ended and the next random access procedure is initiated.

In the above-mentioned embodiments of the present invention, a CC associated with a random access procedure may be called a Primary Cell (P-Cell) and a CC having no connection with a random access procedure may be called a Secondary Cell (S-Cell).

Now, a description will be given of a UE apparatus and an eNB apparatus for performing random access to the eNB as described above.

The UE apparatus and the eNB apparatus include an antenna, a processor, etc. according to device type. The following description is given, focusing on the structure of a processor for controlling the above-described operations.

Figure 1:
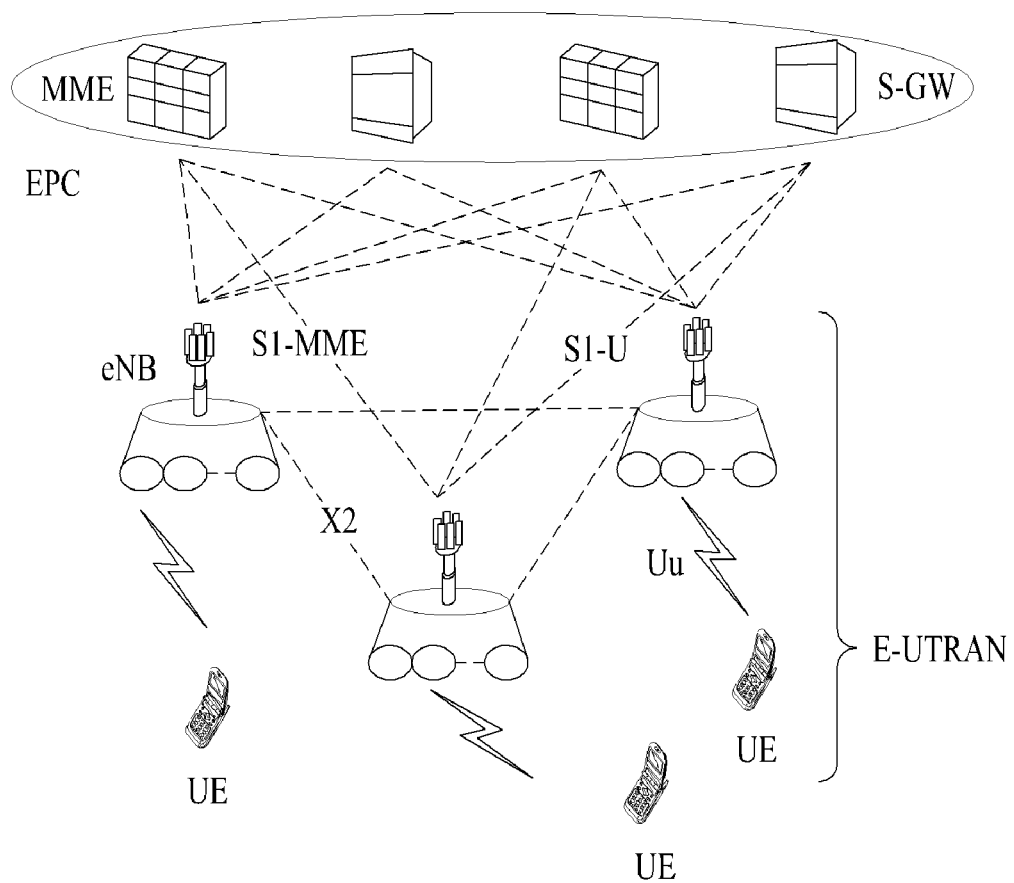
FIG. 1 is a view referred to for describing the configuration of a Long Term Evolution (LTE) system.
Figure 2:
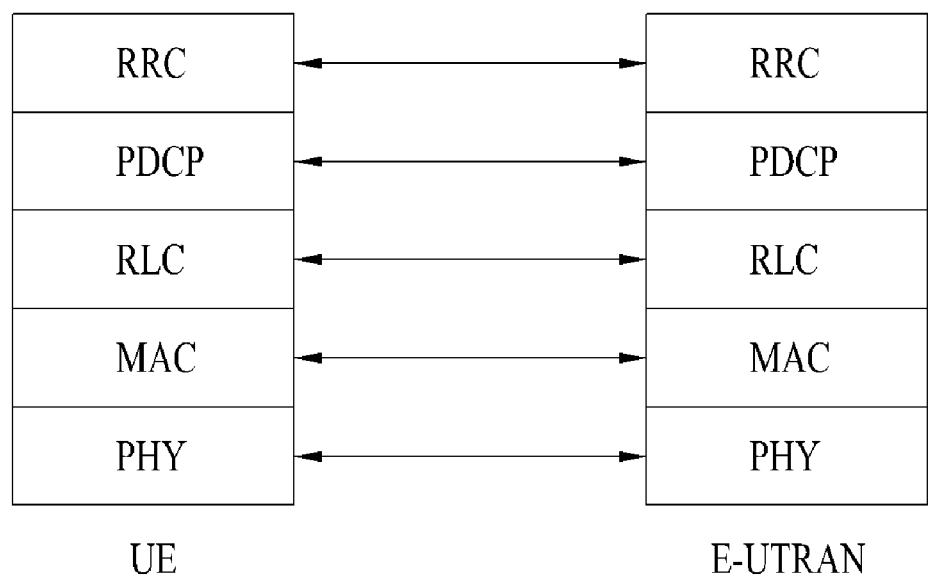
FIGS. 2 and 3 illustrate radio protocol layers.
Figure 3:
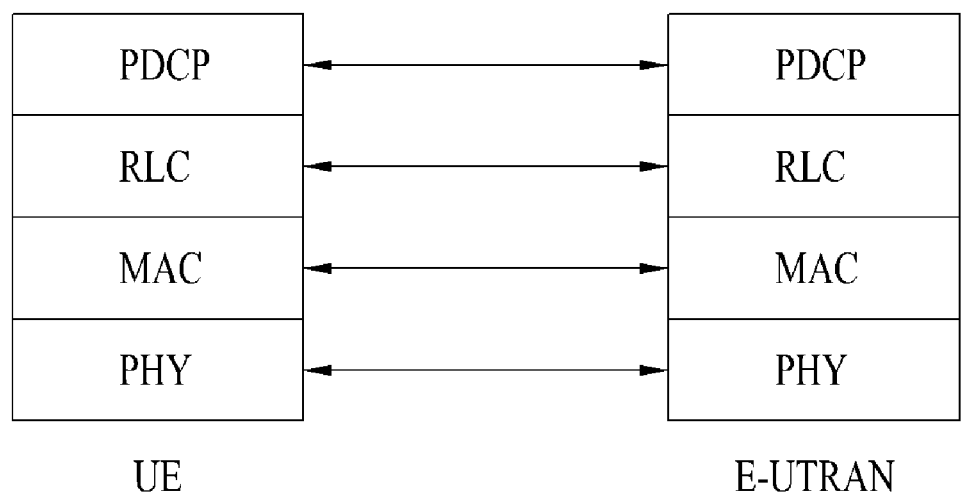
Figure 4:
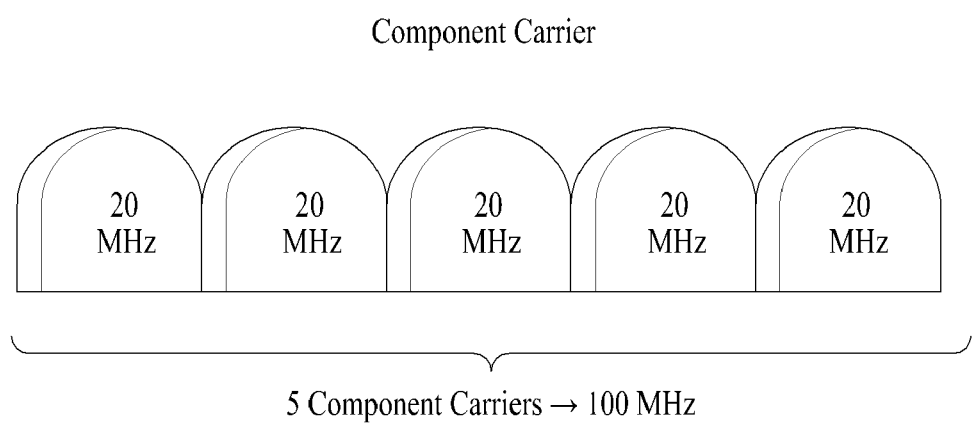
FIG. 4 is a view referred to for describing Carrier Aggregation (CA)

The processors of the UE and the eNB may have the layer structures illustrated in FIGS. 2 and 3. In each embodiment of the present invention, the processors of the UE and the eNB have the following structures for use in a system to which CA is applied.

Figure 8:
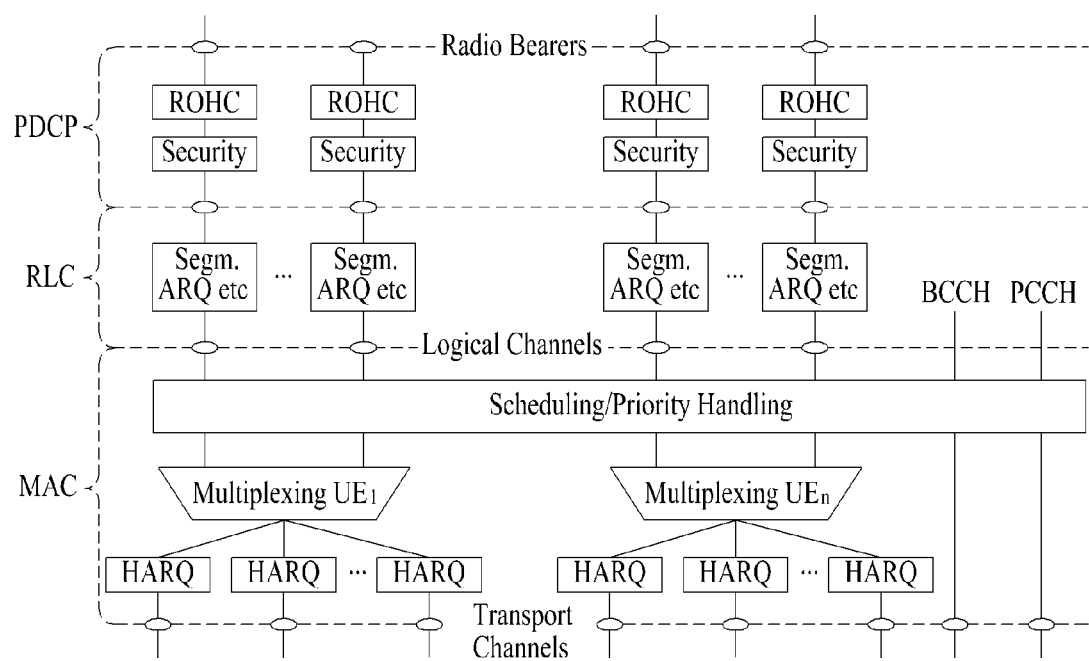
FIGS. 8 and 9 illustrate the structures of processors at the UE and eNB according to an embodiment of the present invention.
Figure 9:
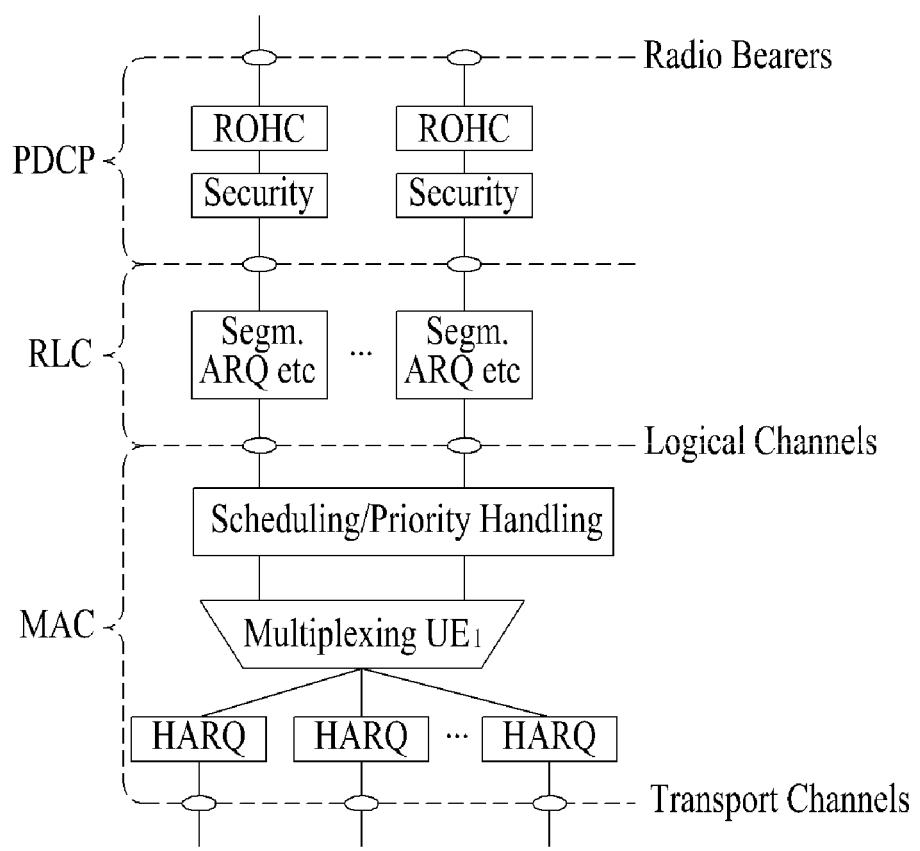

FIGS. 8 and 9 illustrate the structures of processors at the UE and the eNB according to an embodiment of the present invention.

Specifically, FIG. 8 illustrates the downlink L2 structure of the eNB for performing the afore-described method, and FIG. 9 illustrates the uplink L2 structure of the UE for performing the afore-described method.

The CA technology significantly affects the MAC layer at L2. For example, a system using CA uses a plurality of CCs and each HARQ entity manages one CC. Therefore, the MAC layers of the UE processor and the eNB processor should perform operations related to a plurality of HARQ entities in the embodiment of the present invention. In addition, since each HARQ entity processes a transport block, a plurality of transport blocks can be transmitted or received at the same time on a plurality of CCs in CA.

That is, MAC layer modules of the UE and the eNB include a plurality of HARQ entities, each taking charge of a CC in the embodiment of the present invention. As illustrated in FIG. 8, the MAC layer module of the eNB processor may include a multiplexing module for multiplexing a plurality of HARQ entities corresponding 1:1 to a plurality of CCs for each UE (e.g. UE1 or UE2) and a module for scheduling/priority handling for all UEs. As illustrated in FIG. 9, the MAC layer module of the UE may also include a plurality of HARQ entities respectively corresponding to a plurality of CCs, and may include a module for scheduling/priority handling for uplink resources.

The UE apparatus having the above L2 structure will be described in greater detail, from the viewpoint of the afore-described random access procedure.

The UE processor includes an RRC layer module for generating a logical channel signal for RRC connection establishment or reestablishment. For example, an RRC connection request message may be mapped to a CCCH and transmitted to the later-described MAC layer.

The MAC layer module may map the logical channel signal (e.g. the CCCH) for RRC connection establishment/reestablishment to a MAC PDU format and transmit the mapped logical channel signal to the physical layer over a transport channel. The transport channel may be transmitted using any of a plurality of HARQ entities. A physical layer module may map the transport channel signal to a physical channel (e.g. a PDSCH) and transmit the PDSCH to the eNB. In case of the above-described signal for RRC connection establishment/reestablishment, it may be transmitted to the eNB as a third message transmitted in a random access procedure. Meanwhile, first and second messages may be transmitted according to decision of the physical layer irrespective of HARQ entities in the random access procedure.

Meanwhile, the UE processor according to the embodiment of the present invention may be configured to transmit a random access preamble to the eNB using a UL CC to which a backoff period is not applied even when a backoff period is applied to a specific UL CC. That is, the UE processor may operate such that a backoff operation is applied to each UL CC, as described above. To implement this, the processor according to the embodiment of the present invention preferably carries information about a plurality of UL CCs and DL CCs corresponding thereto. The processor may identify a UL CC corresponding to a DL CC carrying a random access response including a backoff indicator and set a specific backoff operation to the UL CC.

In addition, the processor according to the embodiment of the present invention is configured to retransmit a random access preamble through a UL CC corresponding to a backoff period which is ended first when backoff periods are set to all UL CCs applicable to the UE. In the above-described embodiment of the present invention, the UE processor is configured to perform one random access procedure at a specific time, and the random access procedure may mean a procedure of transmitting a first message and receiving a second message. If a random access response message including a backoff indicator is received, the corresponding random access procedure is finished and a new random access procedure is initiated.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

While the above-described embodiments have been described, focusing on the 3GPP LTE system, the present invention is not limited thereto and can be used for a UE to perform a random access procedure in a variety of mobile communication systems to which the CA technology is applied.

The invention claimed is:

1. A method for performing a random access procedure to a base station at a User Equipment (UE) in a mobile communication system using carrier aggregation in which communication is performed using a plurality of component carriers, the method comprising:
transmitting a first random access preamble to the base station through a first uplink component carrier (UL CC) from among a plurality of UL CCs;
receiving a first random access response message including a backoff indicator as a response to the first random access preamble through a first downlink component carrier (DL CC) corresponding to the first UL CC;
applying a backoff period to the first UL CC in consideration of the backoff indicator received through the first random access response message; and
transmitting a second random access preamble to the base station through a second UL CC to which a backoff period is not applied from among the plurality of UL CCs even during the backoff period of the first UL CC.

2. The method according to claim 1, wherein the UE independently manages backoff operations for the plurality of UL CCs when performing the random access procedure to the base station.

3. The method according to claim 2, further comprising acquiring information about the plurality of UL CCs applicable for the random access procedure to the base station and information about a plurality of DL CCs respectively corresponding to the plurality of UL CCs.

4. The method according to claim 1, further comprising:
receiving a second random access response message including a backoff indicator as a response to the second random access preamble through a second DL CC corresponding to the second UL CC;
applying a backoff period to the second UL CC in consideration of the backoff indicator received through the second random access response message; and
transmitting a third random access preamble to the base station through a UL CC corresponding to a backoff period which is ended first from among the plurality of UL CCs when backoff periods are applied to all the plurality of UL CCs.

5. A method according to claim 1, wherein the UE is configured to transmit a random access preamble only through one of the plurality of UL CCs at a specific time and receive a random access response message only through a DL CC corresponding to the one UL CC at a specific time.

6. A user equipment (UE) performing a random access procedure to a base station in a mobile communication system using carrier aggregation in which communication is performed using a plurality of component carriers, the UE comprising:
an antenna; and
a processor, the processor configured to:
transmit a first random access preamble to the base station through a first uplink component carrier (UL CC) from among a plurality of UL CCs;
receive a first random access response message including a backoff indicator as a response to the first random access preamble through a first downlink component carrier (DL CC) corresponding to the first UL CC;
apply a backoff period to the first UL CC in consideration of the backoff indicator received through the first random access response message; and
transmit a second random access preamble to the base station through a second UL CC to which a backoff period is not applied from among the plurality of UL CCs even during the backoff period of the first UL CC.

7. The UE according to claim 6, wherein the processor is further configured to independently manage backoff operations for the plurality of UL CCs when performing the random access procedure to the base station.

8. The UE according to claim 7, wherein the processor is further configured to store information about the plurality of UL CCs applicable to the random access procedure to the base station and information about the plurality of DL CCs respectively corresponding to the plurality of UL CCs.

9. The UE according to claim 6, wherein the processor is further configured to transmit a random access preamble to the base station through a UL CC corresponding to a backoff period which is ended first from among the plurality of UL CCs when backoff periods are applied to all the plurality of UL CCs.

10. The UE according to claim 6, wherein the processor is further configured to transmit a random access preamble only through one of the plurality of UL CCs at a specific time and receive a random access response message only through a DL CC corresponding to the one UL CC at a specific time.

* * * * *